Patented May 20, 1930

1,759,331

UNITED STATES PATENT OFFICE

ROBERT H. VAN SCHAACK, JR., OF EVANSTON, ILLINOIS, ASSIGNOR TO VAN SCHAACK BROS. CHEMICAL WORKS, INC., OF CHICAGO, ILLINOIS, A CORPORATION OF ILLINOIS

DERIVATIVE OF ALKOXY-FATTY ACIDS

No Drawing. Application filed November 12, 1928. Serial No. 319,024.

This invention relates to derivatives of alkoxy-fatty acids and, particularly to those in which there is a secondary alkyl radical in the alkoxy group. Examples of the invention are (1) Ethyl isopropoxyacetate, $(CH_3)_2CHO.CH_2.COO.C_2H_5$.

(2) Isopropyl isopropoxyacetate, $(CH_3)_2CHO.CH_2.COO.CH(CH_3)_2$.

(3) Ethyl secondary-butoxyacetate, $C_2H_5(CH_3)CHO.CH_2.COO.C_2H_5$.

(4) Ethyl isopropoxylaurate, $(CH_3)_2CHO.C_{11}H_{22}.COO.C_2H_5$.

The compounds which I have invented may be represented by the type formula $R^1O.R^2.COO.R^3$, in which $R^1$ represents the algyl radical of a secondary alcohol, as, for example, that of isopropyl, secondary butyl, any secondary amyl, or higher secondary alcohol, $R^2$ represents any alkylene group containing an odd number of carbon atoms, as, for example, $-CH_2-$, $-C_{11}H_{22}-$, $-C_{15}H_{30}-$, $-C_{17}H_{34}-$, $-C_{17}H_{32}-$, $-C_{17}H_{30}-$, and $R^3$ represents any monovalent atom or group, as for example, sodium, potassium, or other metal, hydrogen, methyl, isopropyl, butyl, or other alkyl radical, phenyl, benzyl, or other aryl radical.

The terms $R^1$, $R^2$, and $R^3$ wherever used by me in the specifications, have the same meanings, respectively, as stated above. The meaning of these terms, as used in the claims, is there stated.

Since $R^2$, as stated, represents an alkylene group containing an odd number of carbon atoms, the esters include derivatives of some of the most common acids, as, for example, alkyl alkoxyacetates, laurates, palmitates, stearates, oleates and linoleates.

The metallic derivatives as, for example, $R^1O.R^2.COO.Na$, may be used in the preparation of the corresponding hydrogen derivative, $R^1O.R^2.COOH$. The latter may be used as an acid. It may also be esterified with an alcohol to give an ester. The esters of this type are useful as solvents, as for certain waxes and resins. Alkyl alkoxy esters that boil below 200° C. have characteristic odors and are useful as odoriferous substances.

An illustrative example of one method of making the class of compounds represented by this invention follows: 1 molecular proportion of a substance of the type formula $Cl.R^2.COO.R^3$ is mixed with a solution of 1 molecular proportion of a compound of the formula $R^1O.Na$, the solution being suitably made in anhydrous alcohol of the formula $R^1OH$. The mixture is stirred. The reaction which occurs may be presented by the equation $R^1O.Na + Cl.R^2.COO.R^3 =$
$R^1O.R^2.COO.R^3 + NaCl$.

The reaction is accelerated by warming the mixture, as on a steam bath, under a reflux condenser. After several hours, the precipitated salt is separated by filtration and washed with alcohol. The filtrate is again refluxed and filtered, and the operation repeated until practically no more salt precipitates during several hours' heating. Carbon dioxide is then passed in, to convert any of the compound $R^1O.Na$, that may be still present, to sodium carbonate and an alcohol, thus $2R^1O.Na + CO_2 + H_2O = 2R^1OH + Na_2CO_3$.

The precipitated sodium carbonate, if any forms, is filtered off. The filtrate is then fractionally distilled. After the alcohol employed as a solvent and unused portions of the raw materials have been removed, distillation of the relatively higher boiling ester of the alkoxy-fatty acid may be made in vacuo. The major fraction of the highest boiling point is accepted as comprising the compound $R^1O.R^2.COO.R^3$ and is submitted to analysis.

Another illustrative preparation is made as above except that an alkyl chloracetate is substituted for an equivalent weight of the compound $Cl.R^2.COO.R^3$.

Another example, that illustrates the general method of preparing compounds of the type that I have invented, follows. One molecular proportion of sodium isopropoxide is dissolved in absolute isopropyl alcohol at 50° C. While this solution is being agitated there is added, slowly, 1 molecular proportion of isopropyl chloracetate. The mixture is then refluxed for 2 hours, after which the precipitated salt is filtered out and washed with anhydrous isopropyl alcohol. The filtrate is refluxed for 2 hours more and the small amount of additional salt formed is filtered and washed as above. The filtrate is now made faintly acid with sulfuric acid and then neutral by agitating with an excess of precipitated calcium carbonate. After filtration, the filtrate is fractionally distilled. The fraction boiling at approximately 172.4° C. at a pressure equal to 742 mm. of mercury comprises isopropyl isopropoxy acetate. This fraction, made as above described, had a specific gravity at 20° C. of 0.923, as compared to water at the same temperature, and an ester number equivalent to 100.0% of isopropyl isopropoxyacetate. The fraction was colorless and of a very pleasant odor. It is useful as a perfume.

By "chemical unit", as used in the claims, I mean either an atom or a group of atoms that may be called a radical. Examples of a "chemical unit" in the sense that I use the term are (1) sodium, hydrogen, or other atom, (2) methyl, ethyl, butyl, or other alkyl or aryl radical, or (3) other monovalent groups, as, for example, $$-CH_2.CH_2.OOC.R^2.OR^1,$$

in which $R^1$ and $R^2$ have the same meaning respectively as stated elsewhere in these specifications.

A sodium derivative would have the general formula $R^1O.R^2.COO.Na$. Such a one may be made by saponifying the corresponding ester, of the type formula $$R^1O.R^2.COO.R^3,$$

with an alcoholic solution of sodium hydroxide. The interaction of the resulting sodium salt with dilute sulfuric acid gives the hydrogen derivative that may be represented by the formula $R^1O.R^2.COOH$. This hydrogen derivative may, in turn, be esterified with glycol or glycerine to give esters, as, for example, the glycol ester, $$R^1O.R^2.COO.CH_2.CH_2.OOC.R^2.OR^1.$$

I claim:—

1. A composition of matter comprising a substance that may be represented by the type formula $R^1O.R^2.COO.R^3$, in which $R^1$ represents the alkyl radical of a secondary alcohol, $R^2$ represents an alkylene group containing an odd number of carbon atoms, and $R^3$ represents a monovalent chemical unit.

2. A composition of matter comprising a substance that may be represented by the type formula $R^1O.R^2.COO.R^3$, in which $R^1$ represents the alkyl radical of a secondary alcohol, $R^2$ represents an alkylene group containing an odd number of carbon atoms, and $R^3$ represents a monovalent group of carbon and hydrogen atoms.

3. A composition of matter comprising a substance that may be represented by the type formula $R^1O.R^2.COO.R^3$, in which $R^1$ represents the alkyl radical of a secondary alcohol, $R^2$ represents an alkylene group containing an odd number of carbon atoms, and $R^3$ represents an alkyl group.

4. A composition of matter comprising a substance that may be represented by the type formula $R^1O.R^2.COO.R^3$, in which $R^1$ represents the alkyl radical of a secondary alcohol, $R^2$ represents an alkylene group containing an odd number of carbon atoms, and $R^3$ represents the isopropyl radical.

5. A composition of matter comprising a substance that may be represented by the type formula $R^1O.R^2.COO.R^3$, in which $R^1$ represents the isopropyl radical, $R^2$ represents an alkylene group containing an odd number of carbon atoms, and $R^3$ represents a monovalent chemical unit.

6. A composition of matter comprising a substance that may be represented by the type formula $R^1O.R^2.COO.R^3$, in which $R^1$ represents the isopropyl radical, $R^2$ represents an alkylene group containing an odd number of carbon atoms, and $R^3$ represents a monovalent group of carbon and hydrogen atoms.

7. A composition of matter comprising a substance that may be represented by the type formula $R^1O.R^2.COO.R^3$, in which $R^1$ represents the isopropyl radical, $R^2$ represents an alkylene group containing an odd number of carbon atoms, and $R^3$ represents an alkyl group.

8. A composition of matter comprising a substance that may be represented by the type formula $R^1O.R^2.COO.R^3$, in which $R^1$ represents the isopropyl radical, $R^2$ represents an alkylene group containing an odd number of carbon atoms, and $R^3$ represents the isopropyl radical.

9. A composition of matter comprising a substance that may be represented by the type formula $R^1O.R^2.COO.R^3$, in which $R^1$ represents the isopropyl radical, $R^2$ represents the group $-CH_2-$, and $R^3$ represents a monovalent chemical unit.

10. A composition of matter comprising a substance that may be represented by the type formula $R^1O.R^2.COO.R^3$, in which $R^1$ represents the isopropyl radical, $R^2$ represents the group $-CH_2-$, and $R^3$ represents a monovalent group of carbon and hydrogen atoms.

11. A composition of matter comprising a substance that may be represented by the type formula $R^1O.R^2.COO.R^3$, in which $R^1$ represents the isopropyl radical, $R^2$ represents the group $-CH_2-$, and $R^3$ represents an alkyl group.

12. Isopropyl isopropoxy-acetate which may be represented by the formula $(CH_3)_2CHO.CH_2.COO.CH(CH_3)_2$.

13. A composition of matter comprising the grouping of atoms represented by the general formula $R^1O.R^2.COO-$, in which $R^1$ and $R^2$ have the same meaning respectively as in claim 1.

R. H. VAN SCHAACK, Jr.